United States Patent [19]

Sakakibara et al.

[11] 4,361,164

[45] Nov. 30, 1982

[54] METHOD OF DRIVING SOLENOID-OPERATED PROPORTIONAL CONTROL VALVE

[75] Inventors: Yasuyuki Sakakibara, Okazaki; Hisasi Kawai, Toyohashi; Kazuhiro Sakurai; Kyo Hattori, both of Susono, all of Japan

[73] Assignees: Nippon Soken, Inc., Nishio; Toyota Jidosha Kogyo Kabushiki Kaisha, Toyota, both of Japan

[21] Appl. No.: 181,393

[22] Filed: Aug. 25, 1980

[30] Foreign Application Priority Data

Sep. 5, 1979 [JP] Japan .................................. 54-113917

[51] Int. Cl.³ .............................................. F16K 31/02
[52] U.S. Cl. .................................. 137/14; 137/487.5; 251/140
[58] Field of Search .................. 251/129, 131, 149 X; 137/487.5, 14

[56] References Cited

U.S. PATENT DOCUMENTS 4,017,056  4/1977  Schwalenstocker et al. ...... 251/131

Primary Examiner—Alan Cohan
Assistant Examiner—John A. Rivell
Attorney, Agent, or Firm—Cushman, Darby & Cushman

[57] ABSTRACT

A method of driving a solenoid-operated proportional control valve is disclosed. The solenoid-operated proportional control valve is of the kind in which a valve member is displaced in proportional relation to current supplied to a solenoid under control of a control signal, and the method comprises adding a predetermined value to the control signal when the valve member starts to move to open the solenoid-operated proportional control valve from its full-closed position or subtracting a predetermined value from the control signal when the valve member starts to move to close the solenoid-operated proportional control valve from its full-open position.

5 Claims, 5 Drawing Figures

METHOD OF DRIVING SOLENOID-OPERATED PROPORTIONAL CONTROL VALVE

FIELD OF THE INVENTION

This invention relates to a method of driving a solenoid-operated proportional control valve (so-called "linear solenoid valve") which makes proportional control of the flow rate of a fluid or air-fuel mixture under control of a control signal.

Such a control system is disclosed, for example, in U.S. patent application Ser. No. 62147 filed on July 30, 1979 or in U.S. patent application Ser. No. 123,818 filed on Feb. 22, 1980, both in the name of Kawai et al.

The control system above described includes a solenoid-operated proportional control valve of the type in which a valve member or spool is urged by an electromagnetic force to make axial sliding movement on a cylindrical shaft disposed within a housing, and a slit is formed on the shaft to be opened and closed by the sliding movement of the spool so as to control communication between an inlet pipe and an outlet pipe connected to the housing and communicating with each other through the slit. The full-open and full-closed positions of such a proportional control valve in its actual operation should preferably be slightly or moderately spaced both from the geometrical full-open and full-closed positions of the valve at which the slit is just full opened and full closed by the spool, so that the desired accurate supply and shut-off of a fluid can be ensured.

It is a primary object of the present invention to provide a method of driving a solenoid-operated proportional control valve which is designed to start to close and open from the positions different from the geometrical full-open and full-closed positions in order to ensure a more reliable valve opening and closing operation of quick response.

Other objects, features and advantages of the present invention will be apparent from the following detailed description of a preferred embodiment thereof taken in conjunction with the accompanying drawings.

DESCRIPTION OF THE INVENTION

Figure 1:
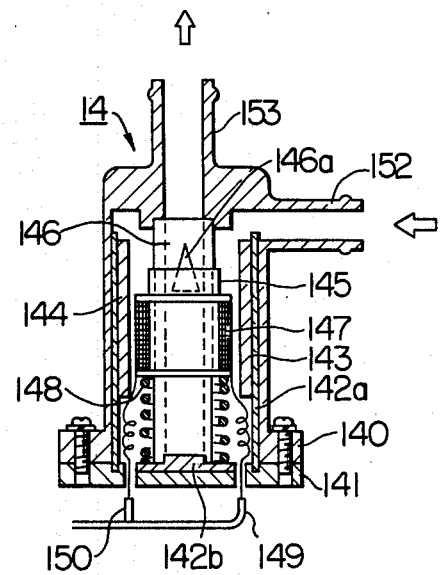
FIG. 1 is a schematic sectional view showing the structure of a solenoid-operated proportional control valve employed in the present invention.

FIG. 1 shows the structure of one from of a solenoid-operated proportional valve 14. Referring to FIG. 1, housings 140 and 141 are securely fixed together by bolts. A supporting member 142a in the form of a sleeve of a magnetic material is fixedly mounted on the inner wall of the housing 140, and another supporting member 142b in the form of a disc of a magnetic material is fixedly mounted on the housing 141. A pair of arcuate permanent magnets 143 and 144 are bonded by a bonding agent to the inner surface of the sleeve-shaped supporting member 142a at positions diametrally opposite to each other. These permanent magnets 143 and 144 are so magnetized that their inner and outer surface portions provide the N and S poles respectively. A valve member or spool 145 is arranged to make axial sliding movement on a hollow cylindrical shaft 146 supported by the supporting member 142b on the housing 141. A coil 147 is wound around the spool 145, and a spring 148 acts to normally bias the spool 145 upward in FIG. 1. Leads 149 and 150 at the turn-starting and turn-terminating ends respectively of the coil 147 are connected to a driver circuit (not shown). A pair of slits 146a each having a shape of an equilateral triangle as shown are bored at diametrally opposite portions of the cylindrical shaft 146, so that, with the axial sliding movement of the spool 145 on the shaft 146, the open area of the slits 146a is varied to control the flow rate of a fluid flowing into the valve 14 via an inlet pipe 152 and flowing out from the valve 14 via an outlet pipe 153. The displacement or stroke of the spool 145 is proportional to the square root of the open area of the slits 146a.

The operation of the proportional control valve 14 having the above structure will now be described. The inner and outer surface portions of the permanent magnets 143 and 144 of arcuate cross section are magnetized to provide the N and S poles respectively, as described hereinbefore. Therefore, a magnetic path is formed which extends from the N pole of the permanent magnet 143 and passes through the shaft 146, the supporting member 142b and the supporting member 142a to terminate in the S pole of the permanent magnet 143. Similarly, another magnetic path is formed which extends from the N pole of the permanent magnet 144 and passes through the shaft 146 and the supporting members 142b and 142a to terminate in the S pole of the permanent magnet 144. Thus, parallel magnetic fields extend toward the center of the shaft 146 from the inner surface portions of the permanent magnets 143 and 144. When a current is supplied to the coil 147 placed in the parallel magnetic fields, an electromagnetic force induced by the Fleming's law acts to urge the coil 147 downward in FIG. 1. Consequently, the spool 145 is shifted downward until its downward movement is stopped by the balance between the electromagnetic force and the force of the spring 148. In this case, the electromagnetic force is proportional to the product of the number of turns N of the coil 147 and the current i flowing through the coil 147. Since the number of turns N is fixed, the electromagnetic force is proportional to the current i supplied to the coil 147. On the other hand, the counter acting force of the spring 148 is represented by the product of the stroke of the spool 145 and the spring constant of the spring 148. Since the stroke of the spool 145 is proportional to the square root of the open area of the slits 146a of the shaft 146 as described hereinbefore, the current to be supplied to the coil 147 through its leads 149 and 150 is proportional to the square root of the open area of the slits 146a.

Figure 2:
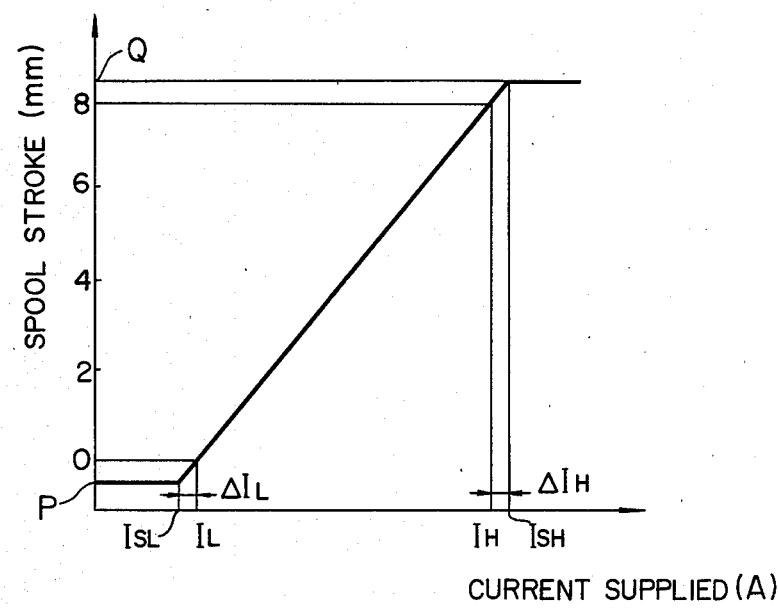
FIG. 2 is a graph showing the relation between the stroke of the spool and the current supplied to the solenoid of the proportional control valve shown in FIG. 1.

However, there are two problems to be considered in connection with the operation of the proportional control valve 14. FIG. 2 shows the relation between the current value supplied to the coil 147 and the stroke of the spool 145. The first problem arises from the relation between the upper end of the spool 145 and the triangular slits 146a of the shaft 146. The proportional control valve 14 is geometrically full closed when the upper end of the spool 145 registers with the vertex of the triangle of each of the triangular slits 146a. Due to, however, the fact that a gap exists actually between the spool 145 and the shaft 146, and air leaks through this gap, the proportional control valve 14 is designed so that, in the actual full-closed position of the valve 14, the spool 145 takes a slightly upwardly overlapping position at which it is located slightly upper than that in the geometrical full-closed position of the valve 14. Similarly, although the proportional control valve 14 is geometrically full opened when the upper end of the spool 145 moving downward registers with the base of the triangle of each of the triangular slits 146a of the shaft 146, the position of the spool 145 in the actual full-open position of the proportional control valve 14 is such that it is located slightly lower than that in the geometrical full-open position of the valve 14, taking control errors into account.

FIG. 2 shows the above relation between the current supplied to the coil 147 and the displacement or stroke of the spool 145. In FIG. 2, the stroke of the spool 145 is 0 mm in the geometrical full-closed position of the proportional control valve 14, and the position P represents that in the actual full-closed position of the proportional control valve 14. The stroke of the spool 145 is 8 mm in the geometrical full-open position of the proportional control valve 14. The position Q represents that in the actual full-open position of the proportional control valve 14, and the stroke of the spool 145 is slightly longer than 8 mm. The difference $\Delta I_L$ between the current value $I_{SL}$ corresponding to the position P and the current value $I_L$ corresponding to the stroke of 0 mm provides the overlap current in the full-closed position of the proportional control valve 14. Similarly, the difference $\Delta I_H$ between the current value $I_{SH}$ corresponding to the position Q and the current value $I_H$ corresponding to the stroke of 8 mm provides the overlap current in the full-open position of the proportional control valve 14. This overlap current must therefore be taken into account for the control.

The second problem resides in the fact that the spool 145 does not move until the current value supplied to the coil 147 exceeds $I_{SL}$. That is, the spool starts to move when the current value supplied to the coil 147 exceeds that level, as will be readily seen in FIG. 2. This current value $I_{SL}$ provides the point of balance between the electromagnetic force and the force of the spring 148. Such an electromagnetic force will be called a setting force herein, and the current value $I_{SL}$ corresponding to this setting force is required to counterbalance the force of the spring 148.

The two problems pointed out above are obstructive of smooth movement of the spool 145 in response to the current supplied to the coil 147.

The present invention obviates the problems encountered in the above system. According to the present invention, a predetermined value is added to the control signal applied to the solenoid-operated proportional control valve 14 so that the current value $I_L$ can be supplied to the coil 147 when the spool 145 in the proportional control valve 14 having the operating characteristic shown in FIG. 2 is to be urged in the opening direction from the full-closed position of the valve 14, that is, when the amount of the fluid supplied through the valve 14 is to be increased (spool 145 is moved down), or a predetermined value is subtracted from the control signal applied to the proportional control valve 14 so that the current value $I_H$ can be supplied to the coil 147 when the spool 145 is to be urged in the closing direction from the full-open position of the valve 14, that is, when the amount of the fluid supplied through the valve 14 is to be decreased (spool 145 is moved up). The speed of response of the proportional control valve 14 to the control signal can thus be increased by the above manner of control.

DESCRIPTION OF THE PREFERRED EMBODIMENT

Figure 3:
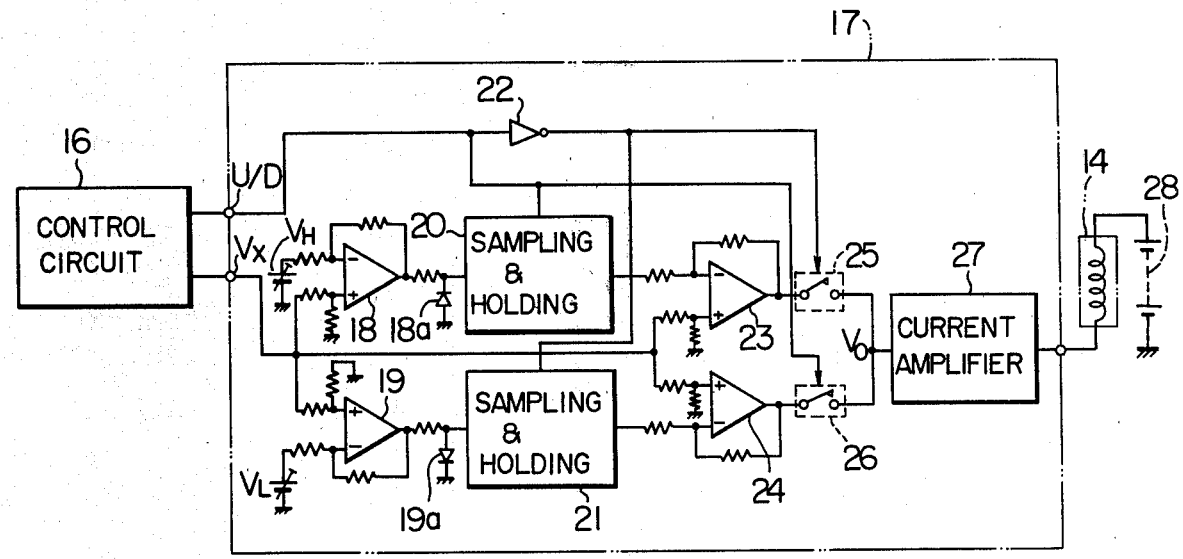
FIG. 3 is an electrical circuit diagram of an embodiment of the present invention.
Figure 4:
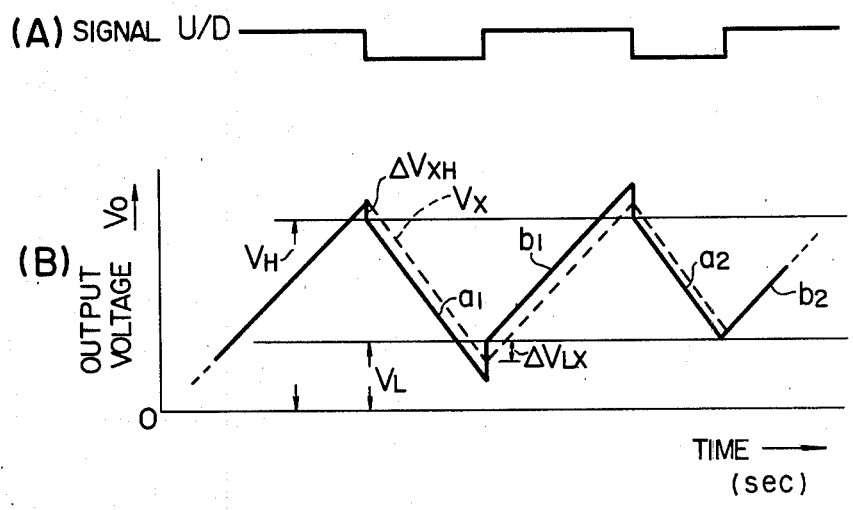
FIG. 4 illustrates the operation of the driver circuit shown in FIG. 3.

A preferred embodiment of the present invention will now be described with reference to FIGS. 3 and 4. FIG. 3 shows an application of the solenoid-operated proportional control valve 14 to the control of the amount of secondary air in an exhaust gas purification system for an internal combustion engine. Referring to FIG. 3, an output signal from an air-fuel ratio sensor sensing the air-fuel ratio on the basis of the exhaust gas components is applied to a control circuit 16 having a structure which is well known in the art. In response to the application of the signal from the air-fuel ratio sensor, the control circuit 16 discriminates whether the sensed air-fuel ratio is higher or lower than a predetermined value which is the stoichiometric air-fuel ratio herein and generates a two-level discrimination signal U/D having a high level and a low level as shown in FIG. 4(A). The control circuit 16 acts also to integrate this discrimination signal to U/D to generate a control signal $V_x$ having a triangular waveform as shown by the broken curves in FIG. 4(B). The detailed structure of this control circuit 16 will not be described as it is well known to those skilled in the art. A driver circuit 17 drives the solenoid-operated proportional control valve 14. This proportional control valve 14 has the structure shown in FIG. 1 and controls the amount of secondary air supplied to the engine exhaust system depending on the output from the driver circuit 17.

The structure of this driver circuit 17 will now be described in detail. The driver circuit 17 includes differential amplifier circuits 18 and 19. A first predetermined reference voltage $V_H$ is applied to the inverted input terminal of the first differential amplifier circuit 18, and the control signal $V_x$ from the control circuit 16 is applied to the non-inverted input terminal of the circuit 18. A second predetermined reference voltage $V_L$ is applied to the inverted input terminal of the second differential amplifier circuit 19, and the control signal $V_x$ from the control circuit 16 is also applied to the non-inverted input terminal of the circuit 19.

The driver circuit 17 further includes sampling and holding circuits 20 and 21. The discrimination signal U/D from the control circuit 16 is applied to the control input terminal of the first sampling and holding circuit 20, so that the circuit 20 samples the output signal from the first differential amplifier circuit 18 when the discrimination signal U/D applied to its control input terminal is in its high level, and the circuit 20 holds the output signal from the circuit 18 when the signal U/D is in its low level. The control input terminal of the second sampling and holding circuit 21 is connected to the output terminal of an inverter 22 which inverts the discrimination signal U/D. The operation of this circuit 21 is entirely similar to that of the circuit 20.

The driver circuit 17 further includes differential amplifier circuits 23 and 24. The output signal from the first sampling and holding circuit 20 is applied to the inverted input terminal of the third differential amplifier circuit 23, and the control signal $V_x$ from the control circuit 16 is applied to the non-inverted input terminal of the circuit 23. This third differential amplifier circuit 23 is connected at its output terminal to a first analog switch 25. The output signal from the second sampling and holding circuit 21 is applied to the inverted input terminal of the fourth differential amplifier circuit 24, and the control signal $V_x$ from the control circuit 16 is also applied to the non-inverted input terminal of the circuit 24. This fourth differential amplifier circuit 24 is connected at its output terminal to a second analog switch 26. The first analog switch 25 has a control input terminal connected to the output terminal of the inverter 22 so that this switch 25 is turned on when the output signal from the inverter 22 turns into its high level. The second analog switch 26 has a control input terminal to which the discrimination signal U/D from the control circuit 16 is applied, so that this switch 26 is turned on when the signal U/D takes its high level. The output terminals of the first and second analog switches 25 and 26 are connected in common to the input terminal of a current amplifier circuit 27. The output terminal of the current amplifier circuit 27 provides the output terminal of the driver circuit 17 and is connected to the coil 147 of the solenoid-operated proportional control valve 14. The other terminal of the proportional control valve 14 is connected to the positive terminal of a battery 28.

The operation of the driver circuit 17 having the above structure will be described with reference to FIG. 4. FIG. 4(A) shows the waveform of the discrimination signal U/D applied from the control circuit 16, and its high level and low level indicate that engine exhaust gases are rich and lean respectively. The control signal $V_x$ applied from the control circuit 16 is a positive voltage signal and has a waveform as shown by the broken curves in FIG. 4(B). In FIG. 4(B), the horizontal axis represents the time, and the vertical axis represents the output voltage $V_o$ appearing from the analog switch 25 or 26.

The output signal from the first differential amplifier 18 is given by $(V_x - V_H)$, where $V_H$ is the first predetermined reference voltage and corresponds herein to the current value $I_H$ in FIG. 2. A diode 18a acts to provide an output voltage of zero volts at the output terminal of the first differential amplifier 18 when $V_x < V_H$. Now, the output signal from the first differential amplifier 18 is expressed as $(v_x - V_H) = \Delta V_{XH}$. The first sampling and holding circuit 20 samples the output signal from the first differential amplifier 18 when the discrimination signal U/D is in its high level, and holds such an output signal when the signal U/D is in its low level. Consequently, the circuit 20 holds the value appearing immediately before the signal U/D turns into its low level from its high level. That is, the circuit 20 holds the maximum value of $\Delta V_{XH}$. Therefore, the output signal from the third differential amplifier 23 is given by $(V_x - \Delta V_H)$. As soon as the discrimination signal U/D turns into its low level, the output signal from the inverter 22 is turned into its high level thereby turning on the first analog switch 25. The output signal $(V_x - \Delta V_{XH})$ appears at the output terminal of this analog switch 25 and has a waveform as shown by the solid curves $a_1$ and $a_2$ in FIG. 4(B).

Then, the output signal given by $(V_x - V_L)$ appears at the output terminal of the second differential amplifier 19. $V_L$ is the second predetermined reference voltage which corresponds herein to the current value $I_L$ in FIG. 2. A diode 19a acts to provide an output voltage of zero volts at the output terminal of the second differential amplifier 19 when $V_L < V_x$. Now, the output signal from the second differential amplifier 19 is expressed as $(V_L - V_x) = \Delta V_{LX}$. The second sampling and holding circuit 21 samples the output signal from the second differential amplifier 19 when the discrimination signal U/D is in its low level (that is, when the output signal from the inverter 22 is in its high level), and holds such an output signal when the signal U/D is in its high level (that is, when the output signal from the inverter 22 is in its low level). Consequently, the circuit 21 holds the value appearing immediately before the signal U/D turns into its high level from its low level. In other words, the circuit 21 holds the value of $-\Delta V_{LX}$. Therefore, the output signal from the fourth differential amplifier 24 is given by $(V_x + \Delta V_{LX})$. As soon as the discrimination signal U/D turns into its high level, the second analog switch 26 is turned on, while the first analog switch 25 is turned off. The output signal $(V_x + \Delta V_{LX})$ appears at the output terminal of the second analog switch 26 and has a waveform as shown by the solid curves $b_1$ and $b_2$ in FIG. 4(B).

The current amplifier circuit 27 converts the voltage signal applied alternately from the analog switches 25 and 26 into a current value and amplifies the current so as to drive the proportional control valve 14.

The general operation of the driver circuit 17 will be described so that the advantages of the present invention can be more clearly understood. When the solenoid-operated proportional control valve 14 is full opened from its closed position and is then closed from its full-open position, the spool 145 does not start to close the slits 146a until the value of the current supplied to the coil 147 is decreased to less than $I_H$ shown in FIG. 2. Therefore, when the proportional control valve 14 is applied to, for example, the control of the amount of secondary air supplied to the exhaust system of an engine as described hereinbefore, a large amount of secondary air will be continuously supplied to provide lean exhaust gases until the current value $I_H$ is reached, and the exhaust gases may become excessively lean due to a delay in the response of the proportional control valve 14. In the embodiment of the present invention, the output voltage $V_o$ supplied from the analog switch 25 or 26 is unconditionally skipped to the voltage $V_H (= V_x - \Delta V_{XH})$ corresponding to the current value $I_H$ during the closing period of the proportional control valve 14 thereby obviating the delayed response. On the other hand, when the proportional control valve 14 is full closed from its open position and is then opened from its full-closed position, the spool 145 does not start to open the slits 146a until the value of the current supplied to the solenoid 147 is increased to more than $I_L$ shown in FIG. 2. In such a case, the exhaust gases may conversely become excessively rich until the current value $I_L$ is reached. In the embodiment of the present invention, the output voltage $V_o$ generated from the driver circuit 17 is unconditionally skipped to the voltage $V_L (= V_x + \Delta V_{LX})$ corresponding to the current value $I_L$ during the opening period of the proportional control valve 14 thereby obviating the defect pointed out above.

Thus, the current range not useful for the proper valve opening or closing operation of the solenoid-operated proportional control valve is skipped, that is, a predetermined value is added to or subtracted from the control signal depending on whether the proportional control valve starts to open from its full-closed position or starts to close from its full-open position. It is therefore possible to increase the speed of response of the proportional control valve, hence, the speed of response of the exhaust gas purification system to which the present invention is applied.

In the aforementioned embodiment of the present invention, an application of the present invention to an engine exhaust gas purification system has been described by way of example. However, it is apparent that the present invention is equally effectively applicable to all of systems employing a solenoid-operated proportional control valve of the kind above described.

Although the driver circuit 17 is designed to carry out the function of skipping or arithmetic processing in the aforementioned embodiment of the present invention, the elements attaining this function may be organically inserted in the circuit generating the control signal $V_X$ in the control circuit 16, so as to simplify the structure of the driver circuit 17.

In the aforementioned embodiment of the present invention, the displacement or stroke of the spool 145 in the solenoid-operated proportional control valve 14 has been controlled by continuously varying the current supplied to the solenoid 147. However, it is apparent that the current supplied to the solenoid 147 may be varied stepwise as disclosed in the aforementioned U.S. patent application Ser. No. 123,818 proposed by the inventors. It is also apparent that the current supplied to the solenoid 147 may be varied according to the duty ratio of a pulse current, that is, according to the mean value of the pulse current.

It will be understood from the foregoing detailed description that the present invention provides a method of driving a solenoid-operated proportional control valve of the kind in which a valve member is displaced in proportional relation to current supplied to a solenoid under control of a control signal, the method comprising adding a predetermined value to the control signal when the valve member starts to move to open the solenoid-operated proportional control valve from its full-closed position or subtracting a predetermined value from the control signal when the valve member starts to move to close the solenoid-operated proportional control valve from its full-open position, whereby the solenoid-operated proportional control valve is prevented from making a delayed response in the initial stage of opening from its full-closed position or in the initial stage of closing from its full-open position, and the operational response of the valve can be therefore improved. As a consequence, the accuracy of control of a control system employing the solenoid-operated proportional control valve can be improved.

We claim:

1. A method of driving a solenoid-operated proportional control valve of the kind in which a valve member is displaced in proportional relation to current supplied to a solenoid under control of a control signal, said method comprising adding a predetermined value to said control signal when said valve member starts to move to open said solenoid-operated proportional control valve from its full-closed position and subtracting a predetermined value from said control signal when said valve member starts to move to close said solenoid-operated proportional control valve from its full-open position.

2. The method of claims 1 or 5 in which said steps of adding a predetermined value to and subtracting a predetermined value from the control signal are accomplished by comparing the control signal with predetermined reference voltages in first differential amplifiers.

3. The method of claim 2 further including the step of sampling and holding the outputs of the first differential amplifiers in dependence upon the position of the movable cover.

4. The method of claim 3 further including the step of combining the outputs of the sample and hold circuits with the control signal in second differential amplifiers, and switching the outputs of the second differential amplifiers through analog switches to a current amplifier supplying current to a solenoid operating the control valve.

5. A method for controlling displacement of a linear solenoid valve comprising a valve aperture and a movable cover means displaceable to open and close the aperture, the cover means being displaced in response to an electric current supplied to a solenoid valve to take any of first through fourth positions, the first position being that the cover means fully closes the aperture by covering an area larger than the aperture, the second position being that the cover means displaces and begins to uncover the closed aperture, the third position being that the cover means displaces to fully open the aperture, and the fourth position being that the cover means displaces and begins to close the opened aperture, said method comprising the steps of:
  generating a closing control signal to displace the valve to the first position;
  adding a predetermined value to the closing control signal in order to start valve opening control from the second position;
  generating an opening control signal to displace the valve to the third position; and
  subtracting a predetermined value from the opening control signal in order to start valve closing control from the fourth position.

* * * * *